United States Patent
Bakshi et al.

(10) Patent No.: US 12,039,044 B2
(45) Date of Patent: Jul. 16, 2024

(54) DATA SECURITY IN A METAVERSE ENVIRONMENT

(71) Applicant: Bank of America Corporation, Charlotte, NC (US)

(72) Inventors: Sakshi Bakshi, New Delhi (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 278 days.

(21) Appl. No.: 17/837,874

(22) Filed: Jun. 10, 2022

(65) Prior Publication Data

US 2023/0401312 A1 Dec. 14, 2023

(51) Int. Cl.
*H04L 29/06* (2006.01)
*G06F 21/31* (2013.01)
*G06F 21/55* (2013.01)

(52) U.S. Cl.
CPC .......... *G06F 21/554* (2013.01); *G06F 21/316* (2013.01); *G06F 2221/034* (2013.01)

(58) Field of Classification Search
CPC . G06F 21/554; G06F 21/316; G06F 2221/034
See application file for complete search history.

(56) References Cited

U.S. PATENT DOCUMENTS

| | | | |
|---|---|---|---|
| 8,127,236 B2 | 2/2012 | Hamilton, II et al. | |
| 8,631,417 B1 | 1/2014 | Mendes Da Costa et al. | |
| 8,869,292 B2 | 10/2014 | Eluard et al. | |
| 8,972,476 B2 | 3/2015 | Titus | |
| 9,026,458 B2 | 5/2015 | Blatchley et al. | |
| 9,189,126 B2 | 11/2015 | Dawson et al. | |
| 9,342,211 B2 | 5/2016 | DeLuca et al. | |
| 9,398,078 B1 | 7/2016 | Mendes da Costa et al. | |
| 9,569,801 B1 | 2/2017 | Xu | |

(Continued)

FOREIGN PATENT DOCUMENTS

| | | | | | |
|---|---|---|---|---|---|
| KR | 20230080009 A | * | 11/2021 | | |
| WO | WO-2005116804 A2 | * | 12/2005 | ............. | G06F 11/00 |
| WO | WO-2023158887 A1 | * | 8/2023 | ............. | G06F 30/27 |

OTHER PUBLICATIONS

Pooyandeh, Mitra, Ki-Jin Han, and Insoo Sohn. "Cybersecurity in the AI-Based metaverse: A survey." Applied Sciences 12.24 ( 2022) (Year: 2022).*

(Continued)

*Primary Examiner* — Shawnchoy Rahman

(57) ABSTRACT

A system includes a plurality of computing nodes that form a blockchain network, wherein one or more of the computing nodes is a metaverse computing node configured to generate a mixed reality environment. A processor of at least one computing node is configured to record a plurality of data interactions performed by a user using a metaverse computing node, determine, based on the plurality of data interactions, a data interaction behavior of the user in relation to the data file, detect that a data interaction performed in relation to the data file of the user is not in accordance with the data interaction behavior of the user, determine that the data interaction is a suspicious data interaction, assign an alert level to the suspicious data interaction, determine at least one action to be performed based on the alert level and perform the at least one action.

20 Claims, 4 Drawing Sheets

(56) References Cited

U.S. PATENT DOCUMENTS

| | | | |
|---|---|---|---|
| 10,142,288 B1* | 11/2018 | Mavor | H04L 63/0236 |
| 10,389,749 B2 | 8/2019 | Kozloski et al. | |
| 10,931,650 B1 | 2/2021 | McCown et al. | |
| 11,170,003 B2 | 11/2021 | Wu et al. | |
| 11,546,322 B1* | 1/2023 | Hardjono | H04L 63/083 |
| 2007/0254631 A1 | 11/2007 | Spooner | |
| 2009/0210301 A1 | 8/2009 | Porter et al. | |
| 2009/0319570 A1 | 12/2009 | Subramanian | |
| 2010/0199200 A1 | 8/2010 | Fujioka | |
| 2011/0060744 A1 | 3/2011 | Brignull et al. | |
| 2013/0276069 A1 | 10/2013 | Roberson et al. | |
| 2017/0236162 A1* | 8/2017 | Christensen | H04N 23/698 705/14.66 |
| 2018/0104595 A1 | 4/2018 | Kawachiya et al. | |
| 2018/0295143 A1 | 10/2018 | Hamilton, II et al. | |
| 2023/0403288 A1* | 12/2023 | Bakshi | H04L 9/50 |

OTHER PUBLICATIONS

Q. Yang, Y. Zhao, H. Huang, Z. Xiong, J. Kang and Z. Zheng, "Fusing Blockchain and AI With Metaverse: A Survey," in IEEE Open Journal of the Computer Society, vol. 3, pp. 122-136, 2022, doi: 10.1109/OJCS.2022.3188249 (Year: 2022).*

* cited by examiner

DATA SECURITY IN A METAVERSE ENVIRONMENT

TECHNICAL FIELD

The present disclosure relates generally to data processing, and more specifically to data security in a metaverse environment.

BACKGROUND

Data interactions in decentralized networks such as a blockchain network are becoming increasingly popular. Data security is of utmost importance in any system that supports online data interactions between computing nodes of the system. However, decentralized networks, by their nature, do not have a central entity that is responsible for administering the security of data interactions within the network. Accordingly, data security and governance is a challenge in decentralized systems. With the advent of metaverse technology that allows users to enter mixed reality environments and perform data interactions, data security has become a bigger challenge as the development of metaverse related technologies is still at a nascent stage and standardized systems that provide robust data security are not yet in place.

SUMMARY

The system and methods implemented by the system as disclosed in the present disclosure provide technical solutions to the technical problems discussed above by detecting and blocking scam data interactions in a decentralized network automatically and intelligently. The disclosed system and methods provide several practical applications and technical advantages.

For example, the disclosed system and methods provide the practical application of intelligently detecting suspicious data interactions conducted in relation to a data file of a user in a decentralized environment including a metaverse environment, verifying the suspicious data interactions, and disabling unverifiable data interactions. As described in accordance with embodiments of the present disclosure, one or more security bots may be employed at a metaverse computing node to monitor and record a plurality of data interactions performed in the metaverse environment by a user in relation to a data file of the user. The data interactions may include receiving data into the data file and transferring data out of the data file. Based on the recorded data interactions of the user, a security bot may determine a data interaction behavior of a user associated with performing data interactions in relation to a data file of the user. The security bot may detect a suspicious data interaction performed in relation to the data file of the user based on the data interaction behavior of the user. For example, the security bot may determine that a data interaction performed in relation to the data file of the user is suspicious if the data interaction is not in accordance with the data interaction behavior of the user. The security bots further perform one or more actions automatically to avoid theft of data from the user data file, the actions including one or more of blocking the suspicious data interaction from being processed completely, placing a temporary hold on all data interactions performed in relation to the data file of the user, placing a temporary hold on all data interactions performed in relation to a scammer data file associated with the suspicious data interaction, and blocking any future data interactions that can result in theft of data from user data file.

By intelligently detecting suspicious data interactions that may result in theft of data from the user data file and taking appropriate actions to block or avoid theft of data, the disclosed system and methods improve data security in decentralized network environments including metaverse environments. The disclosed systems and methods generally improve data security of computing systems used to store and process data in decentralized networks and metaverse environments. By providing a higher level of data security for data interactions conducted in decentralized network environments such as metaverse environment, the disclosed systems and methods improve the technology related to decentralized networks such as blockchain networks and metaverse environments.

The disclosed system and methods provide an additional practical application of simulating suspicious data interactions, verifying the suspicious data interaction while the simulated data interaction is being performed and processing the suspicious data interaction only after the verification is successful. As described in accordance with embodiments of the present disclosure, a Simulation engine is configured to simulate a suspicious data interaction so that no actual transfer of data objects occurs until the suspicious data interaction is verified as a genuine data interaction performed in relation to the user data file. Simulating the suspicious data interaction includes allowing the suspicious data interaction to occur in a synthetic environment (e.g., synthetic metaverse environment) that is substantially identical to an actual environment (e.g., actual metaverse environment) in which the suspicious data interaction would otherwise have occurred. Simulating a suspicious data interaction gives a suspected scammer user an impression that the suspicious data interaction is being processed. However, no actual transfer of data occurs until the suspicious data interaction can be verified as a genuine data interaction. Upon the suspicious data interaction failing the verification, the simulation engine blocks the suspicious data interaction and any future data interactions that may be performed by the scammer. Simulating the suspicious data interaction while the verification of the suspicious data interaction is simultaneous in progress, avoids the scammer user detecting that the data interaction has been flagged and is being verified. This allows the suspicious data interaction and any future data interactions of the scammer user to be blocked without the scammer detecting and withdrawing the data interaction.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
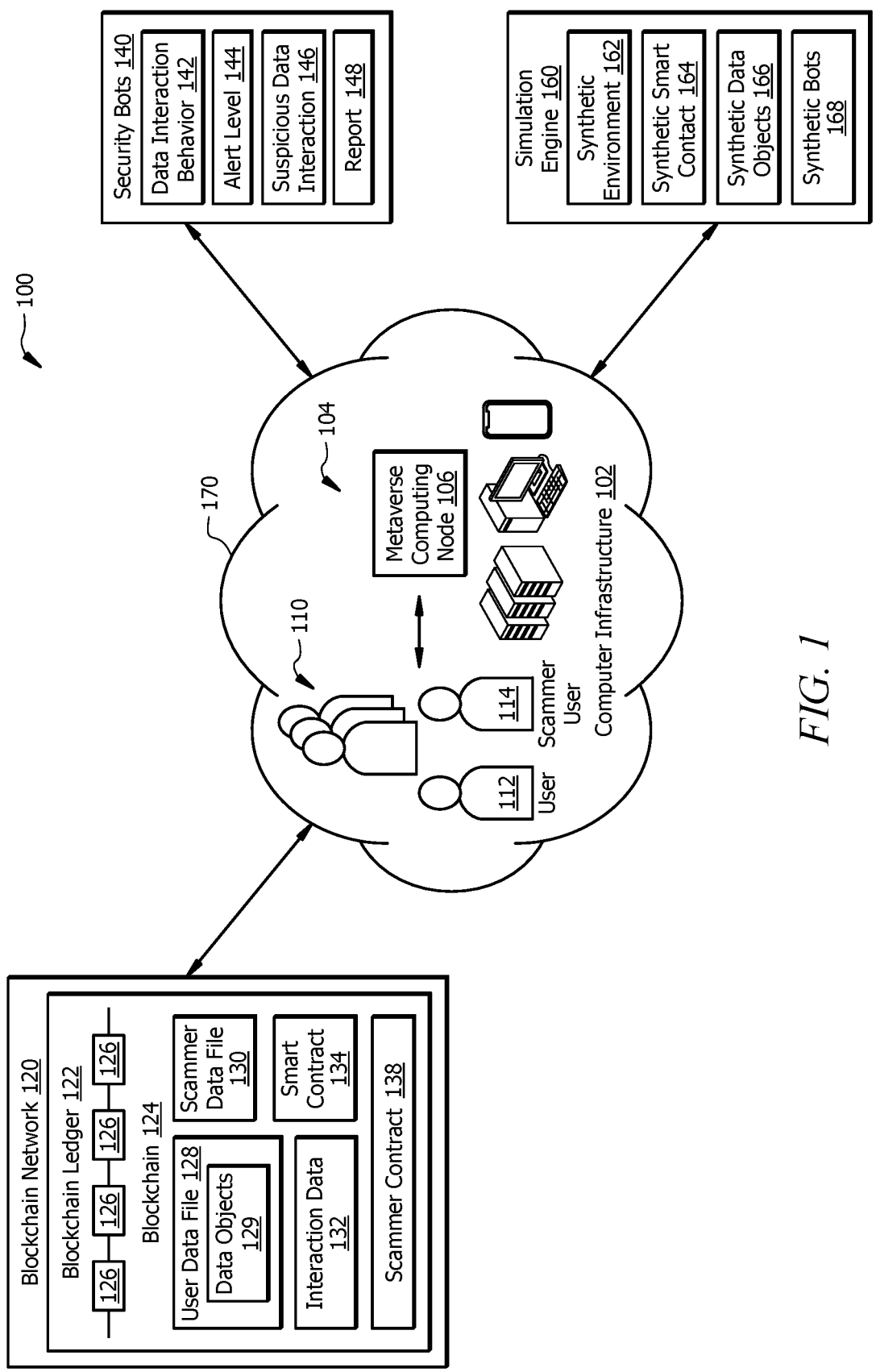
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 including a plurality of computing nodes 104 connected to a network 170. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, and memory devices all connected to the network 170. Software components may include software applications that are run by one or more of the computing nodes 104 including, but not limited to, operating systems, user interface applications, third party software, database management software, service management software, metaverse software and other customized software programs implementing particular functionalities. For example, software code relating to one or more software applications may be stored in a memory device and one or more processors may process the software code to implement respective functionalities. In one embodiment, at least a portion of the computing infrastructure 102 may be representative of an Information Technology (IT) infrastructure of an organization.

One or more of the computing nodes 104 may be operated by a user 110. For example, a computing node 104 may provide a user interface using which a user 110 may operate the computing node 104 to perform data interactions within the computing infrastructure 102.

Each computing node 104 of the computing infrastructure 102 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

As shown in FIG. 1, computing nodes 104 of the computing infrastructure 102 may include a metaverse computing node 106. The metaverse computing node 106 may be capable of generating immersive mixed reality environments that can be used by users 110 of the metaverse computing node 106 to perform digital data interactions with other users 110 of the computing infrastructure 102. For example, a user 110 may enter a mixed reality environment (e.g., using a digital avatar) and interact with digital components within the environment to perform a digital data interaction. The metaverse computing node 106 may include, but is not limited to, a desktop computer, a smartphone, a tablet computer, a laptop computer, a server a virtual reality (VR) headset, an augmented reality (AR) glasses or any other device capable of generating an immersive mixed reality environment.

In one embodiment, one or more metaverse computing nodes 106 may be housed in a metaverse kiosk (not shown), which may be a physical structure (e.g., a room of a building). The metaverse computing nodes 106 housed within these metaverse kiosks may be shared resources that can be used by authorized users 110 to perform data interactions within the computing infrastructure 102. For example, an authorized metaverse service provider may operate a metaverse kiosk having several metaverse computing nodes 106 and other equipment needed to generate immersive mixed reality environments. Users 110 may enter the metaverse kiosk and may be allowed to use a metaverse computing node 106 upon payment of a fee. Additionally or alternatively, a user 110 who is pre-registered with the service provider may use a shared metaverse computing node without paying an additional fee. The computing infrastructure 102 may include several such metaverse kiosks communicatively coupled via network 170, wherein each metaverse kiosk includes one or more metaverse computing nodes 106.

Network 170, in general, may be a wide area network (WAN), a personal area network (PAN), a cellular network, or any other technology that allows devices to communicate electronically with other devices. In one or more embodiments, network 170 may be the Internet.

The computing nodes 104 or a portion thereof of the computing infrastructure 102 may be part of a blockchain network 120. Blockchain network 120 may implement a blockchain 124 across the computing nodes 104. A blockchain (e.g., blockchain 124) generally is an open, decentralized and distributed digital ledger (e.g., blockchain ledger 122) consisting of records called blocks that are used to record data interactions across many computing nodes (e.g., computing nodes 104). Each computing node 104 of a blockchain network (e.g., blockchain network 120) may maintain a copy of the blockchain ledger (e.g., blockchain ledger 122). Logically, a blockchain is a chain of blocks which contains specific information. As shown in FIG. 1, blockchain 124 includes a chain of blocks 126. Once recorded, the data in any given block 126 cannot be altered retroactively without alteration of all subsequent blocks 126, which requires consensus of the network majority. Each computing node 104 within the blockchain network 120 maintains, approves, and updates new entries. The system is controlled not only by separate individuals, but by everyone within the blockchain network 120. Each member ensures that all records and procedures are in order, which results in data validity and security. Thus, the distributed ledger 122 can record data interactions between two parties (e.g., users 110) efficiently and in a verifiable and permanent way. By design, a blockchain 124 is resistant to modification of the data. For use as a distributed ledger (e.g., blockchain ledger 122), a blockchain 124 is typically managed by a peer-to-peer network collectively adhering to a protocol for inter-node communication and validating new blocks 126. In the context of the present disclosure, each computing node 104 may store a copy of the blockchain ledger 122 of the blockchain network 120, wherein each copy of the blockchain ledger 122 includes a copy of the blockchain 124.

Each computing node 104 of a blockchain network (e.g., blockchain network 120) is configured to process new blocks (e.g., blocks 126) generated for the blockchain (e.g., blockchain 124) and maintain a most recent copy of the blockchain in the respective ledgers. Any new interaction or activity within the blockchain network may trigger the building of a new block of the blockchain. An interaction may include a computing node 104 of the blockchain network transmitting or receiving data from another computing node 104 of the blockchain network or from a computing node that is not part of the blockchain network. Before a new block is added to the blockchain, it needs to be verified by a majority of the computing nodes in the blockchain network. For example, once a new block 126 is created at a computing node 104 belonging to the blockchain network 120, the new block 126 is sent to each other computing node 104 in the blockchain network 120. Each other computing node 104 verifies the new block 126 and checks whether the information stated in the new block 126 is correct. Once approved by a majority of the computing nodes 104, the new block 126 is added to the blockchain 124. Once a new block 126 is approved for addition to the blockchain 124, each of the computing nodes 104 of the blockchain network 120 may be configured to update a local copy of the blockchain 124 persisted in the respective ledger 122 to reflect the addition of the new block 126.

Each block 126 of the blockchain includes a hash of the block, a hash of the previous block, data that records one or more data interactions or activities associated with the block, and a timestamp of the one or more interactions or activities recorded by the block. The data stored in each block 126 depends on the type of blockchain 124. For example, the data included in a block 126 may include information relating to the data interaction recorded by the block 126 including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm. A blockchain network 120 uses public-key cryptography to securely transfer data between computing nodes. Public-key cryptography uses a combination of a public key and private key to secure data in a blockchain network so that only the rightful owner of data can access the data. A public key is like an address on the blockchain to which data may be sent and recorded as belonging to that address. A private key is like a password that gives a user access to digital possessions recorded against a public key.

One or more computing nodes 104 may implement one or more other services or functionalities such as security bots 140 and simulation engine 160, each described below in detail. For example, one or more computing nodes 104 may run respective software programs to implement security bots 140 and simulation engine 160. In one embodiment, the security bots 140 and simulation engine 160 may be implemented by an organization or institution that owns and/or manages the computing infrastructure 102 or a portion thereof.

A user 110 authorized to access the blockchain network 120 and allowed to perform data interactions (e.g., with other users 110) within the blockchain network 120 may own and manage one or more data files (e.g., user data file 128). Each data file 128 of a user (e.g., user 112) may store a plurality of data objects 129. One or more data interactions may be performed within the blockchain network 120 in relation to a user data file 128 of a user 112. For example, a data interaction may include transferring one or more data objects 129 from data file 128 of the user 112 to another data file of a different user 110 of the blockchain network 120. Another data interaction may include receiving one or more data objects 129 in the data file 128 of the user 112 from another data file of a different user 110. Information relating to all data interactions that have ever taken place in the blockchain network 120 is stored in the blockchain 124.

Each user 110 of the blockchain may have a unique pair of a public key and a corresponding private key. The public key is like an address of the user 110 on the blockchain to which data objects 129 may be sent and recorded by the blockchain 124 as belonging to that unique address. The private key is like a password that gives the user 110 access to digital objects recorded against the public key. The user data file 128 of the respective user 112 may store this combination of public and private keys. When a user 112 wants to receive digital objects 129 from another user 110 of the blockchain network 120 or from a decentralized data exchange (not shown), user 112 may direct the other user 110 to the unique cryptographic public key of the user 112. The digital objects 129 transferred to the public key or information thereof are stored in the user data file 128 of the user 112. The user 112 may access the digital objects 129 using the respective private key of the user 112. For example, when the user 112 wants to transfer data objects 129 to another user data file of a different user 110 within the blockchain 124, the user 112 may sign an outgoing data interaction using the private key and send out the data objects 129 to a public key of the other user 110.

In one or more embodiments, a user data file 128 of a user 112 or any other user 110 is a software application running on a computing node 104 owned and/or operated by the user 112. When a user 112 wants to receive digital objects 129 from another user 110 of the blockchain network 120 or from a decentralized data exchange (not shown), user 112 may direct the other user 110 to the unique cryptographic address (e.g., public key) issued by the user data file 128. As described above, information relating to all data interactions that have ever taken place in the blockchain network 120 is stored in the blockchain 124. In one embodiment, a user data file 128 may not itself store the data objects 129 but may store information that points to a location of the digital objects 129 within the blockchain 124. A user data file 128 may be web-based or hardware-based. For example, a user data file 128 may be stored in a mobile device or a desktop computer connected to the internet. Additionally or alternatively, a data file may be stored in a device (e.g., USB drive) that is not connected to the internet.

One or more data interactions may be performed in the blockchain network 120 in accordance with smart contracts 134. A smart contract 134 is a software application or a piece of software code that represents an agreement between two users 110. A data interaction (e.g., transfer of data objects between data files) is generally processed when the conditions in the smart contract 134 are met. Smart contracts 134 are stored in the blockchain 124 and can be freely accessed and reviewed by all users 110 of the blockchain. Once created and stored in the blockchain 124, a smart contract 134 generally cannot be modified. Data interactions performed in accordance with a smart contract 134 are processed by the blockchain (e.g., one or more computing nodes 104) without a third party. Smart contracts 134 make it possible to securely automate and decentralize any data interaction conducted in the blockchain network 120 no matter how complex. Thus, smart contracts 134 allow users 110 of the blockchain network 120 to securely engage in complex data interactions without a trusted third party needing to administer these data interactions.

One or more data interactions performed within the blockchain network 120 may be coordinated by a decentralized exchange (not shown). A decentralized exchange may automate data interactions based on smart contracts that include conditions for processing the data interactions. For example, a transfer of data objects 129 between data files of two users 110 may be coordinated by a decentralized exchange by processing a smart contract 134 previously agreed between the two users 110. The decentralized exchange may allow the transfer of data objects 129 to go through when a set of conditions laid out in the smart contract 134 are satisfied.

Data interactions in a decentralized network such as the blockchain network 120 may be prone to scams resulting in theft of data objects 129 from user data files 128 of users (e.g., user 112). Due to the decentralized nature of the blockchain network 120 every user 110 of the blockchain network has rights to enter the network and review data interactions performed in the blockchain network 120. This means a scammer user 114 of the blockchain network 120 may freely review details of all data interactions performed by user 112, including but not limited to frequency of data interactions, amounts of data objects transferred, identity of the receiving user (e.g., public key), identity of a sending user, smart contracts being used for data interactions, identity of a computing node being used by the user 112 to access the blockchain network 120 and schedules of repetitive data interactions. Based on information gathered about a user 112, the scammer user 114 may target the specific user 112 and steal data objects from the user data file 128 of the user 112. For example, the scammer user 114 may use one or more hacking tools to hack into the metaverse computing node 106 used by the user 112 to perform data interactions and may acquire information relating to the user 112 that may allow the scammer user 114 to steal data objects from the user data file 128 of the user 112. For example the scammer user 114 may acquire the public and private key pairs that provide access to data objects 129 stored in the user data file 128 of the user 112, and any other information that may allow the scammer user 114 to steal data objects 129 from the user 112. Once the scammer user 114 acquires the public and private key pairs of the user 112, the scammer user 114 can freely transfer into a scammer data file 130 of the scammer user 114, data objects 129 from the user data file 128 or receive data objects 129 intended for user data file 128. In one example, based on the acquired information relating to the user 112, the scammer user 114 may replicate the user data file 128 as the scammer data file 130 and receive data objects 129 intended for the user data file 128 into the scammer data file 130. Further, to tap into one or more data interactions of the user 112, the scammer user 114 may use a smart contract (shown as scammer contract 138) that is different from the original smart contract 134 used by the user 112 for the data interactions. Using the scammer contract 138 may allow the scammer user 114 to receive digital objects 129 into the scammer data file 130 directly from a source data file without going through a decentralized exchange as may be required by the original smart contract 134.

Embodiments of the present disclosure describe a system and methods implemented by the system that provide a secured environment to users for performing data interactions in a decentralized network such as the blockchain network 120. For example, embodiments of the present disclosure provide a secure mixed reality environment (e.g., metaverse environment) for users to perform data interactions.

One or more security bots 140 may monitor data interactions performed in the blockchain network 120 to detect scams being carried out against users 110. For example, one or more security bots 140 may be employed at a metaverse kiosk to monitor data interactions performed using one or more metaverse computing nodes 106 provided at the metaverse kiosk. A security bot 140 may be a software program configured to detect scams including theft of data objects 129 carried out in the blockchain network 120.

While certain embodiments of the present disclosure discuss that the security bots 140 monitor data interactions performed at a metaverse computing node 106, it may be noted that one or more security bots 140 may be employed to monitor data interactions performed at or using any computing node 104 of the blockchain network 120 and that techniques for detecting and blocking scam data interactions equally apply to such cases. Further, while certain embodiments of the present disclosure discuss techniques for securing data interactions performed in a metaverse environment, it may be noted that the disclosed techniques equally apply to securing all data interactions performed in the blockchain network 120.

In one or more embodiments, one or more security bots 140 may be configured to monitor and record a plurality of data interactions performed by a user 110 (e.g., user 112 or scammer user 114) using a computing node 104 (e.g., a metaverse computing node 106). Information relating to the monitored data interactions may be stored in the blockchain 124 as interaction data 132. The interaction data 132 relating to a data interaction performed by a user 112 may include, but is not limited to, an identity of the user data file 128, amount of data objects 129 transferred (e.g., received or sent) as part of the data interaction, a smart contract 134 used for the data interaction, a public key associated with the data interaction (e.g., public key of the receiving data file), and a time of the data interaction.

In one or more embodiments, the blockchain 124 leverages hash graph technology to efficiently store information (e.g., interaction data 132) within the blockchain 124. Hash graph is a distributed consensus algorithm that provides near-perfect efficiency in bandwidth usage and consequently can process hundreds of thousands of data interactions per second in a single shard (a fully connected, peer-to-peer mesh of nodes in a network). Unlike a traditional proof-of-work blockchain, which selects a single miner to choose the next block, the community of nodes running hash graph come to an agreement on which data interactions to add to the ledger (e.g., blockchain ledger 122) as a collective. Thus, leveraging the hash graph algorithm to store data in the blockchain 124 greatly increases the efficiency of the blockchain 124 which in turn helps the security bots to quickly make decisions relating to suspicious data interactions.

A security bot 140 may be configured to determine a data interaction behavior 142 of a user 110 based on the interaction data 132 collected for the user over a pre-configured time period. In one embodiment, a security bot 140 may be configured to extract interaction data 132 of a user 112 stored in the blockchain 124 and determine a new data interaction behavior 142 of the user 112 or update a previously recorded data interaction behavior 142 of the user 112. A data interaction behavior 142 of a user 112 may include a pattern of data interactions performed by the user 112 including, but not limited to, transfer of data objects 129 from user data file 128 at regular time intervals (e.g., periodically or according to a pre-determined schedule), receipt of data objects 129 into the user data file 128 at regular time intervals (e.g., periodically or according to a pre-determined schedule), amounts of data objects 129 transferred out from the data file 128 and amounts of data objects 129 received in the data file 128.

Additionally or alternatively, a security bot 140 may be configured to monitor scams (e.g., theft of digital objects 129) carried out by a scammer user 114 in relation to the data file 128 of user 112. Based on detecting a series of scams conducted by the scammer user 114 in relation to the data file 128 of user 112, the security bot 140 may determine a data interaction behavior 142 of the scammer user 114 in relation to scamming the data file 128 of user 112. For example, a security bot 140 may be configured to detect scams (e.g., theft of data objects 129) performed by the scammer user 114 in relation to a user data file 128 based on monitoring data interactions relating to the user data file 128. In one example, after reviewing interaction data 132 relating to a data interaction that transfers a first amount of data objects 129 to the user data file 128, a security bot 140 may detect that a portion of the first amount of data objects 129 was received at the user data file 128 and a remaining portion was transferred to a scammer data file 130 of a scammer user 114. In another example, a user 112 may have setup pre-scheduled automatic transfer of the first amount data objects 129 from the user data file 128 to a target data file. A security bot 140 may record this data interaction behavior 142 of the user 112. Based on the recorded data interaction behavior 142 of user 112, a security bot 140 may expect the first amount of data objects 129 to be transferred to the user data file 128 at a pre-scheduled time. However, the security bot 140 may detect that only a portion of the first amount was transferred to the user data file 128. In response, the security bot 140 may review the interaction data 132 of the data interaction stored in the blockchain and detect that the remaining portion of the first amount was received in the scammer data file 130 of the scammer user 114. The scammer user 114 may steal a portion of data objects 129 from one or more data interactions prescheduled by the user 112. The security bot 140 may record each detected scam carried out by the scammer user 114 in relation to the user data file 128 and may determine a behavior of the scammer user 114 based on the series of scams. The data interaction behavior 142 of the scammer user 114 may include, but is not limited to, amount of data objects stolen from user data file 128, times of the scams, frequency of scamming user data file 128, schedule of scamming user data file 128, identity of the scammer data file 130 (e.g., public key), and a smart contracts used to conduct scam data interactions. In one embodiment, the determination of data interaction behavior 142 of the scammer user 114 may also include other detected scams carried out by the scammer in relation to other data files 128 of other users 110.

One or more security bots 140 may be configured to predict future scams that may occur in relation to the user data file 128 of user 112 based on the data interaction behavior 142 of user 112, data interaction behavior 142 of scammer user 114 or combination thereof. For example, based on a pattern of data interactions performed by user 112 and a pattern of scams performed by the scammer user on the user data file, a security bot 140 may predict a potential future scam that may be carried out in relation to the user data file 128. The security bot 140 may predict a time of scam, an amount of data objects 129 that may be stolen from user data file 128, details of a scheduled data interaction of user 112 that may be scammed (e.g., amount of data objects to be transferred to or out of user data file 128, smart contract 134 to be used for the data interaction, scheduled time of data interaction, computing node to be used to conduct the data interaction, a decentralized data exchange to be used for the data interaction etc.), identity of scammer data file (e.g., public key) that is to receive stolen data objects 129, and a computing node (e.g., metaverse computing node 106) to be used for carrying out the scam. Following the second example from the previous paragraph, based on the data interaction behavior 142 of the user 112 of transferring the first amount of data objects 129 from the data file 128 at scheduled times and based on the data interaction behavior 142 of the scammer user 114 of stealing a portion of the first amount of data objects 129 during one or more data interactions scheduled by the user 112, security bot 140 may predict that the scammer user 114 may steal a certain amount of data objects 129 from the user data file 128 during a particular data interaction scheduled by the user 112. In this example, security bot 140 may predict a time of the scam, an amount of data objects 129 that are to be stolen, details of a scheduled data interaction of user 112 that may be scammed, identity of scammer data file (e.g., public key) that is to receive stolen data objects 129, and a computing node (e.g., metaverse computing node 106) to be used for carrying out the scam.

In one or more embodiments, a security bot 140 may be configured to designate a data interaction that was performed, being performed or predicted to be performed in relation to the user data file 128 of user 112 as a suspicious data interaction 146, when the data interaction is not in accordance with or contrary to data interaction behavior 142 of user 112, and/or when a suspected theft of data objects 129 is detected or predicted to occur as a result of the data interaction. In one example, when a security bot 140 detects an unscheduled data interaction (e.g., not expected based on data interaction behavior 142 of user 112) that transfers data from the user data file 128 or to the user data file 128, the security bot 140 may designate the unscheduled data interaction as a suspicious data interaction 146. In a second example, when a security bot 140 detects that user data file 128 received only a portion of data objects 129 expected to be received as part of a scheduled data interaction (e.g., expected based on data interaction behavior 142 of user 112), the security bot 140 designates the data interaction as a suspicious data interaction 146. In a third example, a security bot 140 may designate as suspicious data interaction 146 a predicted future scam data interaction that may occur in relation to the user data file 128 of user 112 based on the data interaction behavior 142 of user 112.

One or more security bots 140 may be configured to assign an alert level 144 to a suspicious data interaction 146 based on an amount of data objects 129 stolen, being stolen or predicted to be stolen from user data file 128. Additionally or alternatively, a security bot 140 may assign the alert level 144 based on a value of the data interaction, for example, an amount of data objects 129 being transferred as part of the suspicious data interaction 146. A security bot 140 may assign a higher alert level 144 to a suspicious data interaction 146 associated with a higher amount of data objects 129. For example, the security bot 140 may assign a higher alert level 144 when a higher amount of data objects 129 are stolen, being stolen or predicted to be stolen, and/or when the suspicious data interaction 146 transfers, is transferring or predicted to transfer a higher amount of data objects 129. In one example, a security bot 140 may assign a high alert level 144 to a suspicious data interaction 146 when the amount of data objects associated with the suspicious data interaction 146 equals or exceeds a threshold amount of data objects 129. The security bot 140 assigns a low alert level 144 when the amount of data objects associated with the suspicious data interaction 146 is below the threshold amount of data objects 129.

One or more security bots 140 may be configured to generate a report 148 for one or more data interactions designated as suspicious data interactions 146. A security bot 140 may include in the report 148 information relating to the suspicious data interaction 146 including, but not limited to, one or more of a digital identity (e.g., public key) of the user data file 128 of the user 112, a smart contract 134 of the user 112 relating to the suspicious data interaction 146, a digital identity (e.g., public key) of a potential scammer data file 130, a time the suspicious data interaction was processed or is predicted to be processed, and an amount of data objects 129 associated with the suspicious data interaction. In one embodiment, the report may include information based on the security bot 140 review a record of a suspicious data interaction 146 stored in the blockchain 124. For example, when a security bot 140 detects an unscheduled data interaction (e.g., based on data interaction behavior 142 of user 112) that transfers data from the user data file 128 or to the user data file 128, the security bot 140 may designate the unscheduled data interaction as a suspicious data interaction 146. The security bot 140 may further investigate the data interaction by reviewing the record of the data interaction stored in the blockchain 124. If the suspicious data interaction has resulted in a theft of data objects 129, the security bot 140 generates a report that includes information relating to the suspicious data interaction.

A security bot 140 may send the report 148 of a suspicious data interaction 146 to an administrative computing node (not shown) operated by one or more administrators of the blockchain network 120. Based on the report 148, an administrator may take one or more actions to avoid present or future scams of the user data file 128. The one or more actions may include, but are not limited to, one or more of blocking the suspicious data interaction 146 from being processed completely, placing a temporary hold on all data interactions performed in relation to the data file 128 of the user 112, placing a temporary hold on all data interactions performed in relation to a scammer data file 130 associated with the suspicious data interaction 146, and blocking any future data interactions that can result in theft of data objects 129 from user data file 128.

One or more security bots 140 may be configured to determine one or more actions that can be performed in relation to a suspicious data interaction 146 to avoid present or future scams of the user data file 128. The one or more actions may include, but are not limited to, one or more of blocking the suspicious data interaction 146 from being processed completely, placing a temporary hold on all data interactions performed in relation to the data file 128 of the user 112, placing a temporary hold on all data interactions performed in relation to a scammer data file 130 associated with the suspicious data interaction 146, blocking one or more future data interactions that can result in theft of data objects 129 from user data file 128, sending a report 148 including information relating to the suspicious data interaction to an administrative node, sending a report 148 including information relating to the suspicious data interaction to a simulation engine 160 (discussed below). In one embodiment, a security bot 140 may be configured to automatically perform the one or more of the determined actions in relation to a suspicious data interaction 146.

A security bot 140 may be configured to determine one or more actions to be taken in relation to a suspicious data interaction 146 based on an alert level 144 assigned to the suspicious data interaction 146. In one embodiment, when a low alert level 144 has been assigned to a suspicious data interaction 146, the security bot 140 may send a report 148 including information relating to the suspicious data interaction to an administrative node. The security bot 140 may include in the report 148 information relating to one or more actions discussed above that can be taken. In this case, the decision regarding which one or more actions suggested by the security bot 140 is to be taken is left to an administrator. In an additional or alternative embodiment, when a high alert level 144 is assigned to a suspicious data interaction 146, the security bot 140 may send a report 148 including information relating to the suspicious data interaction to a simulation engine 160 (discussed below). The security bot 140 may additionally send the report 148 to the administrative node. As discussed below, the simulation engine may simulate the suspicious data interaction 146 so that actual transfer of data objects does not occur.

Simulation engine 160 may be configured to simulate a suspicious data interaction 146 so that no actual transfer of data objects occurs until the suspicious data interaction 146 is verified as a genuine data interaction performed in relation to the user data file 128. In one embodiment, simulating a suspicious data interaction 146 may include allowing the suspicious data interaction to occur in a synthetic environment 162 (e.g., metaverse environment) that is substantially identical to an actual environment (e.g., metaverse environment) in which the suspicious data interaction would otherwise have occurred. Simulating a suspicious data interaction 146 may give a suspected scammer user 114 an impression that the suspicious data interaction 146 is being processed by the blockchain network 120. However, no actual transfer of data objects 129 occur until the suspicious data interaction 146 can be verified as a genuine data interaction.

Simulation engine 160 may be configured to receive information relating to a suspicious data interaction 146 being performed or predicted to be performed in relation to the user data file 128. For example, as described above, a security bot 140 may send a report 148 including information relating to the suspicious data interaction to the simulation engine 160. The report 148 may include information relating to the suspicious data interaction 146 including, but not limited to, one or more of a digital identity (e.g., public key) of the user data file 128 of the user 112, a smart contract 134 of the user 112 relating to the suspicious data interaction 146, a digital identity (e.g., public key) of a potential scammer data file 130, a time the suspicious data interaction was processed or is predicted to be processed, an amount of data objects 129 associated with the suspicious data interaction, data interaction behaviors 142 of user 112 and/or scammer user 114, and any other information needed to build synthetic data interaction components to simulate the suspicious data interaction 146.

In one or more embodiments, in response to receiving information (e.g., report 148) relating to a suspicious data interaction 146 predicted to occur in the future in a mixed reality environment such as a metaverse environment, the simulation engine generates a plurality of synthetic data interaction components that can be used simulate the suspicious data interaction 146. The synthetic data interaction components may include a synthetic environment 162 (e.g., synthetic metaverse environment), a synthetic smart contract 164, one or more synthetic data objects and one or more synthetic bots 168. The synthetic environment 162 is a simulated mixed reality environment (e.g., metaverse environment) that is substantially identical to an actual mixed reality environment (e.g., metaverse environment) in which the scammer user 114 is predicted to perform the suspicious data interaction 146. The synthetic smart contract 164 is substantially identical to an original/genuine smart contract 134 of the user 112 that is used for a genuine data interaction similar to the suspicious data interaction 146. Synthetic data objects 166 simulate the actual data objects 129 that would be transferred as part of the suspicious data interaction 146. In one embodiment, the synthetic data objects 166 may be programmed to not go through a decentralized data exchange and directly be deposited in the scammer data file 130. Synthetic bots 168 may be substantially identical to one or more corresponding security bots 140 that are configured to monitor data interactions in the blockchain network (e.g., at a metaverse computing node 106). Each set of synthetic data interaction components is generated based on the specific information relating to the suspicious data interaction 146 and to closely simulate the respective actual data interaction components to be used in the suspicious data interaction 146. For example, different data interactions may use different smart contracts 134. Thus, the synthetic smart contract 164 must mirror the actual smart contract 134 that should be used for a genuine data interaction (e.g., corresponding to the suspicious data interaction 146) in relation to the user data file 128.

Simulation engine 160 may be configured to deploy synthetic data interaction components at a metaverse computing node 106 that is predicted to be used by the scammer user 114 to perform the suspicious data interaction 146. Deploying the synthetic components may include replacing the actual metaverse environment generated by the metaverse computing node 106 with the synthetic environment 162 and simulating the suspicious data interaction 146 in the synthetic environment 162. When the scammer user 114 attempts to perform the suspicious data interaction 146, the scammer user 114 is directed to the synthetic environment 162 where the scammer 114 is allowed to proceed with the simulated data interaction, for example, based on the synthetic smart contract 164 and including depositing synthetic objects 166 into the scammer data file 130.

Simulation engine 160 may receive reports 148 relating to several suspicious data interactions 146 predicted to be performed by the scammer user 114 in relation to the user data file 128. Simulation engine may be configured to generate several sets of synthetic components, each set corresponding to a specific suspicious data interaction predicted to occur in the future. Simulation engine 160 may deploy the sets of synthetic components in advance (e.g., at the respective metaverse computing nodes 106 indicated by report 148) to simulate the respective suspicious data interactions 146 in case the scammer user 114 attempts the suspicious data interactions 146.

Once a suspicious data interaction 146 is initiated by the scammer user 114, simulation engine 160 may be configured to perform a pre-check to verify whether the data interaction is being performed by the genuine user 112. Upon detecting that the genuine user 112 is performing the suspicious data interaction 146, simulation engine 160 may not simulate the data interaction and may allow the actual data interaction to be processed. Simulation engine 160 may be configured to perform the pre-check by comparing the synthetic smart contract 164 with the smart contract being used for the suspicious data interaction 146. As described above the synthetic smart contract 164 is identical to the original smart contract 134 which a genuine user 112 uses for performing a data interaction. When the synthetic smart contract 164 matches with the smart contract being used for the suspicious data interaction 146, simulation engine 160 determines that the suspicious data interaction 146 is a genuine data interaction (e.g., genuine user 112 is performing the suspicious data interaction 146) and does not simulate the data interaction and allows the data interaction to be processed as usual. However, when the synthetic smart contract 164 fails to match with the smart contract being used for the suspicious data interaction 146, simulation engine 160 determines that the suspicious data interaction 146 is a potential scam data interaction (e.g., the genuine user 112 is not performing the suspicious data interaction 146), and in response, proceeds to simulate the suspicious data interaction 146. For example, the scammer user 114 may use a smart contract that is different from the smart contract 134 generally used by user 112. The different smart contract may allow the scammer user 114 to perform a direct transfer of data objects 129 from the user data file 128 to the scammer data file 130 as opposed to the data objects 129 passing through a decentralized data exchange as may be required by the original smart contract 134. In this case, the synthetic smart contract, which is identical to the original smart contract 134, may not match the different smart contract being used by scammer user 114 for the suspicious data interaction 146.

Once the suspicious data interaction 146 fails the pre-check and it has been determined that the suspicious data interaction 146 is a potential scam interaction, the simulation engine 160 proceeds to simulate the suspicious data interaction 146 as described above. Simulation engine 160 may be configured to verify the suspicious data interaction 146 while the simulated data interaction is being performed/processed. In one embodiment, to verify the suspicious data interaction 146 the simulation engine may inspect the smart contract being used for the suspicious data interaction 146. As described above, a smart contract may specify one or more conditions for transferring data objects between data files of the blockchain network. In one embodiment, the smart contract being used by the scammer user 114 to perform the suspicious data interaction 146 may specify conditions for transferring data objects 129 from the user data file 128 that are different from conditions specified by an original smart contract 134 generally used by the genuine user 112 to transfer data objects 129 out of the user data file 128. For example, the original smart contract 134 may specify that, before being deposited into a target data file, a transfer of data objects 129 from the user data file 128 must pass through a decentralized data exchange which implements transfer of the data objects 129 between computing nodes based on the smart contract 134. However, the smart contract being used to perform the suspicious data interaction 146 may allow a direct transfer of data objects 129 from the user data file 128 to the scammer data file 130. A direct transfer of data objects 129 allows the scammer user 114 to evade one or more conditions implemented by the decentralized data exchange based on the original smart contract 134. The simulation engine 160 may be configured to determine that the suspicious data interaction 146 has failed verification, when the smart contract used for the suspicious data interaction 146 specifies conditions for transfer of data objects 129 that are different from conditions specified by the original smart contract 134. For example, simulation engine 160 may be configured to determine that the suspicious data interaction 146 has failed verification, when the smart contract used for the suspicious data interaction 146 allows direct transfer direct transfer of data objects 129 from the user data file 128 to the scammer data file 130.

When the suspicious data interaction 146 fails verification, simulation engine 160 may be configured to block the suspicious data interaction 146 from being processed. Additionally or alternatively, simulation engine 160 may be configured to disable one or more future data interactions processed using the same smart contract used to process the suspicious data interaction 146. In one embodiment, the synthetic smart contract 164 may be programmable and may include self-reactive software code. When simulation engine 160 determines that the suspicious data interaction 146 failed verification, the self-reactive software code may be activated and automatically processed to disable future data interactions that use the same smart contract used to process the suspicious data interaction 146, meaning any further theft of data objects 129 may be stopped. In one embodiment, the self-reactive software code modifies the smart contract used to perform the suspicious data interaction 146 to generate a modified smart contract that specifies that any future data interactions performed using the same smart contract will be automatically flagged and disabled. Modifying the smart contract may include adding one or more lines of software code to the smart contract that flags and disables future data interactions. For example, when a future data interaction is performed based on the modified smart contract (e.g., with the added software code), the one or more lines of code are automatically processed to disable the future data interaction. As described above, once generated and stored in the blockchain 124, a smart contract cannot be modified. Thus, the scammer user 114 may not be able to change the modified smart contract without discarding the scammer data file 130. This prohibits the scammer user 114 from performing any future data interactions using the same smart contract that was used to perform the first suspicious data interaction 146.

In one or more embodiments, when the suspicious data interaction 146 passes verification, simulation engine 160 may terminate the simulated data interaction and process the suspicious data interaction.

In one or more embodiments, simulation engine 160 may be configured to generate several sets of plug and play synthetic components, each set including one or more of a synthetic environment 162, a synthetic smart contract 164, one or more synthetic data objects 166 and synthetic bots 168. Each set of synthetic components may correspond to a specific type of scam data interaction known to be carried out by scammer users 114 in typical blockchain network. Thus, each set of plug and play synthetic components is configured to simulate a particular type of scam data interaction (e.g., suspicious data interaction 146) and/or to block future scam data interactions of the type. Simulation engine 160 may add the sets of synthetic components as Non-Fungible Tokens (NFTs) to an NFT marketplace. Any organization or institution that manages at least a portion of a blockchain network may acquire one or more of the sets of plug and play synthetic components from the NFT marketplace based on the specific types of scam data interaction being carried out in their blockchain networks. The plug and play synthetic components may be deployed at a computing node 104 (e.g., metaverse computing node 106) of any blockchain network with little to no customization to simulate suspicious data interactions and block present future data interactions.

Figure 2:
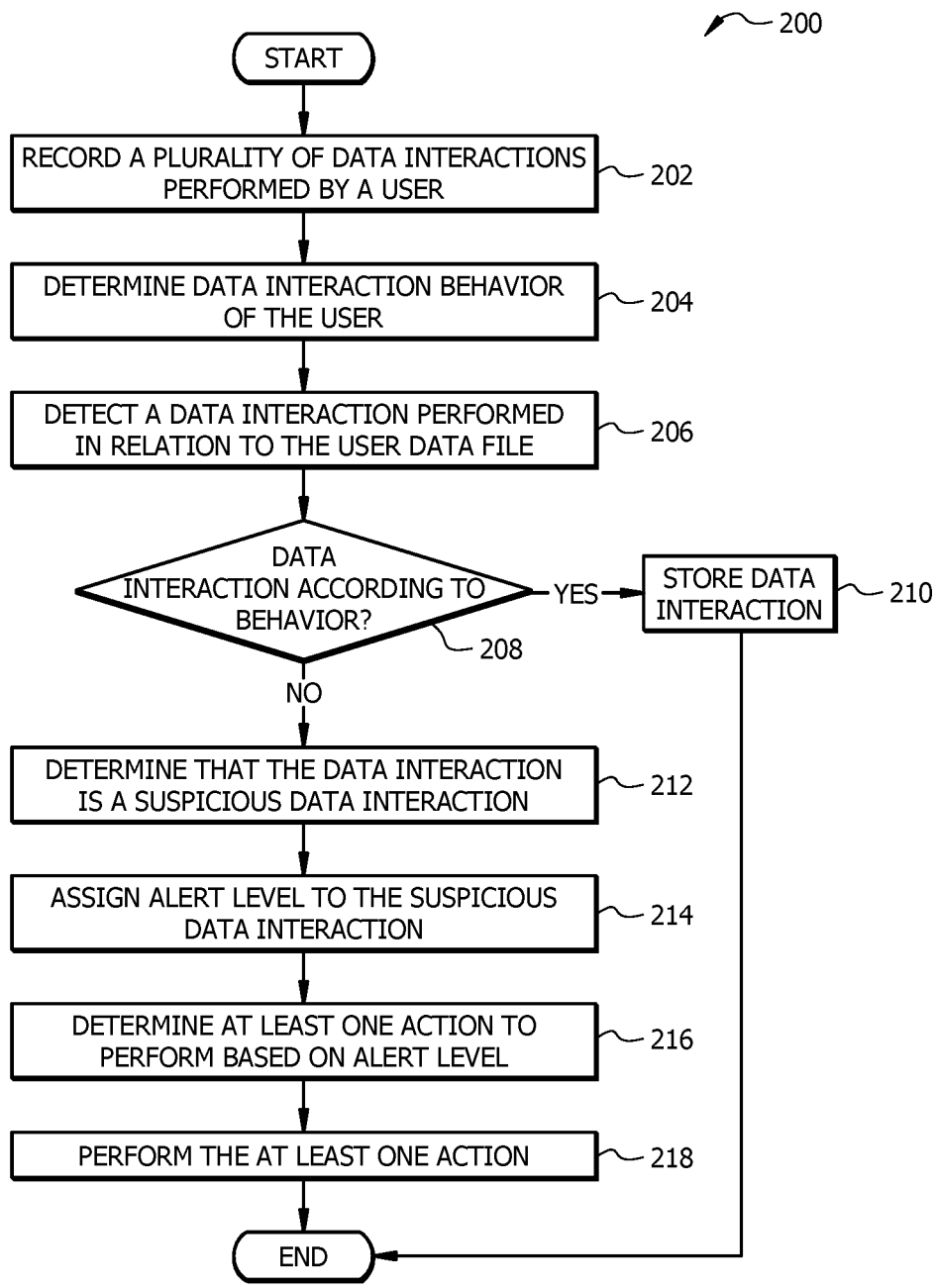
FIG. 2 illustrates a flowchart of an example method for detecting a suspicious data interaction, in accordance with one or more embodiments of the present disclosure.

FIG. 2 illustrates a flowchart of an example method 200 for detecting a suspicious data interaction, in accordance with one or more embodiments of the present disclosure. Method 200 may be performed by one or more security bots 140 shown in FIG. 1.

At operation 202, a security bot 140 records a plurality of data interactions performed by a user 112 using a metaverse computing node 106, wherein the data interactions include receiving data objects 129 into a user data file 128 of the user 112 or sending data objects 129 from the user data file 128 of the user 112.

As described above, one or more security bots 140 may monitor data interactions performed in the blockchain network 120 to detect scams being carried out against users 110. For example, one or more security bots 140 may be employed at a metaverse kiosk to monitor data interactions performed using one or more metaverse computing nodes 106 provided at the metaverse kiosk. A security bot 140 may be a software program configured to detect scams including theft of data objects 129 carried out in the blockchain network 120. In one or more embodiments, one or more security bots 140 may be configured to monitor and record a plurality of data interactions performed by a user 110 (e.g., user 112 or scammer user 114) using a computing node 104 (e.g., a metaverse computing node 106). Information relating to the monitored data interactions may be stored in the blockchain 124 as interaction data 132. The interaction data 132 relating to a data interaction performed by a user 112 may include, but is not limited to, an identity of the user data file 128, amount of data objects 129 transferred (e.g., received or sent) as part of the data interaction, a smart contract 134 used for the data interaction, a public key associated with the data interaction (e.g., public key of the receiving data file), and a time of the data interaction.

At operation 204, the security bot may determine, based on the recorded plurality of data interactions, a data interaction behavior 142 of the user in relation to the user data file 128.

As described above, a security bot 140 may be configured to determine a data interaction behavior 142 of a user 110 based on the interaction data 132 collected for the user over a pre-configured time period. In one embodiment, a security bot 140 may be configured to extract interaction data 132 of a user 112 stored in the blockchain 124 and determine a new data interaction behavior 142 of the user 112 or update a previously recorded data interaction behavior 142 of the user 112. A data interaction behavior 142 of a user 112 may include a pattern of data interactions performed by the user 112 including, but not limited to, transfer of data objects 129 from user data file 128 at regular time intervals (e.g., periodically or according to a pre-determined schedule), receipt of data objects 129 into the user data file 128 at regular time intervals (e.g., periodically or according to a pre-determined schedule), amounts of data objects 129 transferred out from the data file 128 and amounts of data objects 129 received in the data file 128.

Additionally or alternatively, a security bot 140 may be configured to monitor scams (e.g., theft of digital objects 129) carried out by a scammer user 114 in relation to the user data file 128 of user 112. Based on detecting a series of scams conducted by the scammer user 114 in relation to the user data file 128 of user 112, the security bot 140 may determine a data interaction behavior 142 of the scammer user 114 in relation to scamming the user data file 128 of user 112. For example, a security bot 140 may be configured to detect scams (e.g., theft of data objects 129) performed by the scammer user 114 in relation to a user data file 128 based on monitoring data interactions relating to the user data file 128. In one example, after reviewing interaction data 132 relating to a data interaction that transfers a first amount of data objects 129 to the user data file 128, a security bot 140 may detect that a portion of the first amount of data objects 129 was received at the user data file 128 and a remaining portion was transferred to a scammer data file 130 of a scammer user 114. In another example, a user 112 may have setup pre-scheduled automatic transfer of the first amount data objects 129 from the user data file 128 to a target data file. A security bot 140 may record this data interaction behavior 142 of the user 112. Based on the recorded data interaction behavior 142 of user 112, a security bot 140 may expect the first amount of data objects 129 to be transferred to the user data file 128 at a pre-scheduled time. However, the security bot 140 may detect that only a portion of the first amount was transferred to the user data file 128. In response, the security bot 140 may review the interaction data 132 of the data interaction stored in the blockchain and detect that the remaining portion of the first amount was received in the scammer data file 130 of the scammer user 114. The scammer user 114 may steal a portion of data objects 129 from one or more data interactions prescheduled by the user 112. The security bot 140 may record each detected scam carried out by the scammer user 114 in relation to the user data file 128 and may determine a behavior of the scammer user 114 based on the series of scams. The data interaction behavior 142 of the scammer user 114 may include, but is not limited to, amount of data objects stolen from user data file 128, times of the scams, frequency of scamming user data file 128, schedule of scamming user data file 128, identity of the scammer data file 130 (e.g., public key), and a smart contracts used to conduct scam data interactions. In one embodiment, the determination of data interaction behavior 142 of the scammer user 114 may also include other detected scams carried out by the scammer in relation to other data files 128 of other users 110.

At operation 206, the security bot 140, detects a data interaction performed in relation to the user data file 128 of the user 112 or predicted to be performed in relation to the user data file 128 of the user 112.

At operation 208, the security bot 140 may check whether the detected data interaction is in accordance with the data interaction behavior 142 of the user 112. When the detected data interaction is a data interaction predicted to take place in the future (e.g., based on the data interaction behavior 142 of the user 112), the security bot 140 may check whether the predicted data interaction is expected to be in accordance with the data interaction behavior 142 of the user 112.

In one example, after reviewing interaction data 132 relating to a data interaction that transfers a first amount of data objects 129 to the user data file 128, a security bot 140 may detect that a portion of the first amount of data objects 129 was received at the user data file 128 and a remaining portion was transferred to a scammer data file 130 of a scammer user 114. In response, the security bot 140 may determine that the data interaction is not in accordance with the data interaction behavior 142 of the user 112.

In a second example, a user 112 may have setup pre-scheduled automatic transfer of the first amount data objects 129 from the user data file 128 to a target data file. A security bot 140 may record this data interaction behavior 142 of the user 112. Based on the recorded data interaction behavior 142 of user 112, a security bot 140 may expect the first amount of data objects 129 to be transferred to the user data file 128 at a pre-scheduled time. However, the security bot 140 may detect that only a portion of the first amount was transferred to the user data file 128. In response, the security bot 140 may determine that the data interaction is not in accordance with the data interaction behavior 142 of the user 112.

In a third example, when a security bot 140 detects an unscheduled data interaction (e.g., not expected based on data interaction behavior 142 of user 112) that transfers data from the user data file 128 or to the user data file 128, the security bot 140 may determine that the data interaction is not in accordance with the data interaction behavior 142 of the user 112.

Further, as described above, one or more security bots 140 may be configured to predict future scams that may occur in relation to the user data file 128 of user 112 based on the data interaction behavior 142 of user 112, data interaction behavior 142 of scammer user 114 or combination thereof. For example, based on a pattern of data interactions performed by user 112 and a pattern of scams performed by the scammer user on the user data file, a security bot 140 may predict a potential future scam that may be carried out in relation to the user data file 128. The security bot 140 may predict a time of scam, an amount of data objects 129 that may be stolen from user data file 128, details of a scheduled data interaction of user 112 that may be scammed (e.g., amount of data objects to be transferred to or out of user data file 128, smart contract 134 to be used for the data interaction, scheduled time of data interaction, computing node to be used to conduct the data interaction, a decentralized data exchange to be used for the data interaction etc.), identity of scammer data file (e.g., public key) that is to receive stolen data objects 129, and a computing node (e.g., metaverse computing node 106) to be used for carrying out the scam. Following the second example from the previous paragraph, based on the data interaction behavior 142 of the user 112 of transferring the first amount of data objects 129 from the data file 128 at scheduled times and based on the data interaction behavior 142 of the scammer user 114 of stealing a portion of the first amount of data objects 129 during one or more data interactions scheduled by the user 112, security bot 140 may predict that the scammer user 114 may steal a certain amount of data objects 129 from the user data file 128 during a particular data interaction scheduled by the user 112. In response, the security bot 140 may determine that the predicted data interaction is not in accordance with the data interaction behavior 142 of the user 112. In this example, security bot 140 may predict a time of the scam, an amount of data objects 129 that are to be stolen, details of a scheduled data interaction of user 112 that may be scammed, identity of scammer data file (e.g., public key) that is to receive stolen data objects 129, and a computing node (e.g., metaverse computing node 106) to be used for carrying out the scam.

If security bot 140 determines that the detected data interaction behavior is in accordance with the data interaction behavior 142 of the user 112, method 200 proceeds to operation 210 where the security bot 140 forwards the data interaction for storing in the blockchain 124.

On the other hand, if security bot 140 determines that the detected data interaction behavior is not in accordance with the data interaction behavior 142 of the user 112, method 200 proceeds to operation 212.

At operation 212, the security bot 140 determines that the detected data interaction is a suspicious data interaction.

As described above, a security bot 140 may be configured to designate a data interaction that was performed, being performed or predicted to be performed in relation to the user data file 128 of user 112 as a suspicious data interaction 146, when the data interaction is not in accordance with or contrary to data interaction behavior 142 of user 112, and/or when a suspected theft of data objects 129 is detected or predicted to occur as a result of the data interaction. In one example, when a security bot 140 detects an unscheduled data interaction (e.g., not expected based on data interaction behavior 142 of user 112) that transfers data from the user data file 128 or to the user data file 128, the security bot 140 may designate the unscheduled data interaction as a suspicious data interaction 146. In a second example, when a security bot 140 detects that user data file 128 received only a portion of data objects 129 expected to be received as part of a scheduled data interaction (e.g., expected based on data interaction behavior 142 of user 112), the security bot 140 designates the data interaction as a suspicious data interaction 146. In a third example, a security bot 140 may designate as suspicious data interaction 146 a predicted future scam data interaction that may occur in relation to the user data file 128 of user 112 based on the data interaction behavior 142 of user 112 and/or the data interaction behavior of the scammer user 114.

At operation 214, the security bot assigns an alert level to the suspicious data interaction. As described above, one or more security bots 140 may be configured to assign an alert level 144 to a suspicious data interaction 146 based on an amount of data objects 129 stolen, being stolen or predicted to be stolen from user data file 128. Additionally or alternatively, a security bot 140 may assign the alert level 144 based on a value of the data interaction, for example, an amount of data objects 129 being transferred or expected to be transferred as part of the suspicious data interaction 146. A security bot 140 may assign a higher alert level 144 to a suspicious data interaction 146 associated with a higher amount of data objects 129. For example, the security bot 140 may assign a higher alert level 144 when a higher amount of data objects 129 are stolen, being stolen or predicted to be stolen, and/or when the suspicious data interaction 146 transfers, is transferring or expected to transfer a higher amount of data objects 129. In one example, a security bot 140 may assign a high alert level 144 to a suspicious data interaction 146 when the amount of data objects associated with the suspicious data interaction 146 equals or exceeds a threshold amount of data objects 129. The security bot 140 assigns a low alert level 144 when the amount of data objects associated with the suspicious data interaction 146 is below the threshold amount of data objects 129.

At operation 216, the security bot 140 determines at least one action to be performed to avoid theft of the data objects 129 associated with the data interaction.

As described above, one or more security bots 140 may be configured to determine one or more actions that can be performed in relation to a suspicious data interaction 146 to avoid present or future scams of the user data file 128. The one or more actions may include, but are not limited to, one or more of blocking the suspicious data interaction 146 from being processed completely, placing a temporary hold on all data interactions performed in relation to the data file 128 of the user 112, placing a temporary hold on all data interactions performed in relation to a scammer data file 130 associated with the suspicious data interaction 146, blocking one or more future data interactions that can result in theft of data objects 129 from user data file 128, sending a report 148 including information relating to the suspicious data interaction to an administrative node, sending a report 148 including information relating to the suspicious data interaction to a simulation engine 160 (discussed below). In one embodiment, a security bot 140 may be configured to automatically perform the one or more of the determined actions in relation to a suspicious data interaction 146.

A security bot 140 may be configured to determine one or more actions to be taken in relation to a suspicious data interaction 146 based on an alert level 144 assigned to the suspicious data interaction 146. In one embodiment, when a low alert level 144 has been assigned to a suspicious data interaction 146, the security bot 140 may send a report 148 including information relating to the suspicious data interaction to an administrative node. The security bot 140 may include in the report 148 information relating to one or more actions discussed above that can be taken. In this case, the decision regarding which one or more actions suggested by the security bot 140 is to be taken is left to an administrator. In an additional or alternative embodiment, when a high alert level 144 is assigned to a suspicious data interaction 146, the security bot 140 may send a report 148 including information relating to the suspicious data interaction to a simulation engine 160 (discussed below). The security bot 140 may additionally send the report 148 to the administrative node. As discussed below, the simulation engine may simulate the suspicious data interaction 146 so that actual transfer of data objects does not occur.

At operation 218, the security bot performs the at least one action to avoid theft of the data objects 129.

Figure 3:
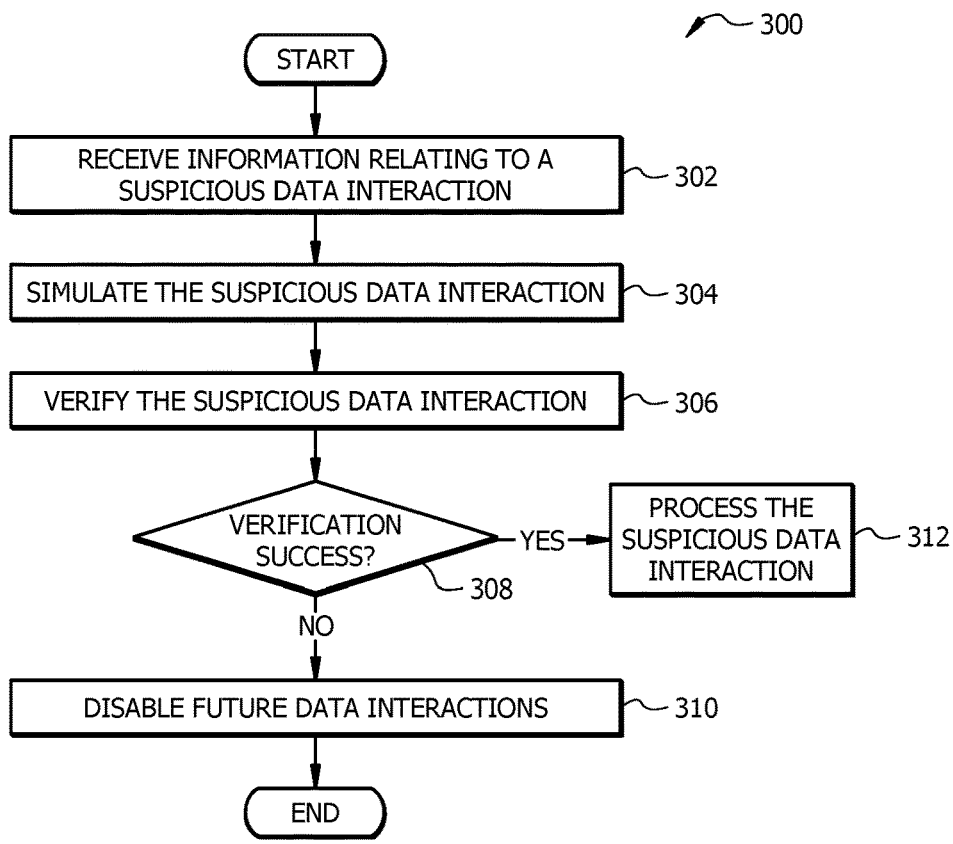
FIG. 3 illustrates a flowchart of an example method for simulating a suspicious data interaction, in accordance with one or more embodiments of the present disclosure.

FIG. 3 illustrates a flowchart of an example method 300 for simulating a suspicious data interaction, in accordance with one or more embodiments of the present disclosure. Method 300 may be performed by the simulation engine 160 shown in FIG. 1.

At operation 302, the simulation engine 160 receives information relating to a suspicious data interaction 146 associated with a data file (e.g., user data file 128) of a user (e.g., user 112), wherein the suspicious data interaction 146 is performed or predicted to be performed in a mixed reality environment (e.g., metaverse environment) in accordance with a smart contract.

As described above, simulation engine 160 may be configured to receive information relating to a suspicious data interaction 146 being performed or predicted to be performed in relation to the user data file 128. For example, as described above, a security bot 140 may send a report 148 including information relating to the suspicious data interaction to the simulation engine 160. The report 148 may include information relating to the suspicious data interaction 146 including, but not limited to, one or more of a digital identity (e.g., public key) of the user data file 128 of the user 112, a smart contract 134 of the user 112 relating to the suspicious data interaction 146, a digital identity (e.g., public key) of a potential scammer data file 130, a time the suspicious data interaction was processed or is predicted to be processed, an amount of data objects 129 associated with the suspicious data interaction, data interaction behaviors 142 of user 112 and/or scammer user 114, and any other information needed to build synthetic data interaction components to simulate the suspicious data interaction 146.

At operation 304, simulation engine 160 simulates, based on the received information, the suspicious data interaction 146 in a synthetic mixed reality environment (e.g., synthetic environment 162) that is substantially identical to the mixed reality environment in which the suspicious data interaction is performed or to be performed, wherein the simulated data interaction simulates processing of the suspicious data interaction 146 without transfer of data objects 129.

As described above, simulation engine 160 may be configured to simulate a suspicious data interaction 146 so that no actual transfer of data objects occurs until the suspicious data interaction 146 is verified as a genuine data interaction performed in relation to the user data file 128. In one embodiment, simulating a suspicious data interaction 146 may include allowing the suspicious data interaction 146 to occur in a synthetic environment 162 (e.g., metaverse environment) that is substantially identical to an actual environment (e.g., metaverse environment) in which the suspicious data interaction is occurring or would otherwise have occurred. Simulating a suspicious data interaction 146 may give a suspected scammer user 114 an impression that the suspicious data interaction 146 is being processed by the blockchain network 120. However, no actual transfer of data objects 129 occur until the suspicious data interaction 146 can be verified as a genuine data interaction.

As described above, after receiving information (e.g., report 148) relating to a suspicious data interaction 146 predicted to occur in the future in a mixed reality environment such as a metaverse environment, the simulation engine generates a plurality of synthetic data interaction components that can be used to simulate the suspicious data interaction 146. The synthetic data interaction components may include a synthetic environment 162 (e.g., synthetic metaverse environment), a synthetic smart contract 164, one or more synthetic data objects and one or more synthetic bots 168. The synthetic environment 162 is a simulated mixed reality environment (e.g., metaverse environment) that is substantially identical to an actual mixed reality environment (e.g., metaverse environment) in which the scammer user 114 is predicted to perform the suspicious data interaction 146. The synthetic smart contract 164 is substantially identical to an original/genuine smart contract 134 of the user 112 that is used for a genuine data interaction similar to the suspicious data interaction 146. Synthetic data objects 166 simulate the actual data objects 129 that would be transferred as part of the suspicious data interaction 146. In one embodiment, the synthetic data objects 166 may be programmed to not go through a decentralized data exchange and directly be deposited in the scammer data file 130. Synthetic bots 168 may be substantially identical to one or more corresponding security bots 140 that are configured to monitor data interactions in the blockchain network (e.g., at a metaverse computing node 106). Each set of synthetic data interaction components is generated based on the specific information relating to the suspicious data interaction 146 and to closely simulate the respective actual data interaction components to be used in the suspicious data interaction 146. For example, different data interactions may use different smart contracts 134. Thus, the synthetic smart contract 164 mirrors the actual smart contract 134 that should be used for a genuine data interaction (e.g., corresponding to the suspicious data interaction 146) in relation to the user data file 128.

Simulation engine 160 may be configured to deploy synthetic data interaction components at a metaverse computing node 106 that is predicted to be used by the scammer user 114 to perform the suspicious data interaction 146. Deploying the synthetic components may include replacing the actual metaverse environment generated by the metaverse computing node 106 with the synthetic environment 162 and simulating the suspicious data interaction 146 in the synthetic environment 162. When the scammer user 114 attempts to perform the suspicious data interaction 146, the scammer user 114 is directed to the synthetic environment 162 where the scammer 114 is allowed to proceed with the simulated data interaction, for example, based on the synthetic smart contract 164 and including depositing synthetic objects 166 into the scammer data file 130.

Simulation engine 160 may receive reports 148 relating to several suspicious data interactions 146 predicted to be performed by the scammer user 114 in relation to the user data file 128. Simulation engine may be configured to generate several sets of synthetic components, each set corresponding to a specific suspicious data interaction predicted to occur in the future. Simulation engine 160 may deploy the sets of synthetic components in advance (e.g., at the respective metaverse computing nodes 106 indicated by report 148) to simulate the respective suspicious data interactions 146 in case the scammer user 114 attempts the suspicious data interactions 146.

Once a suspicious data interaction 146 is initiated by the scammer user 114, simulation engine 160 may be configured to perform a pre-check to verify whether the data interaction is being performed by the genuine user 112. Upon detecting that the genuine user 112 is performing the suspicious data interaction 146, simulation engine 160 may not simulate the data interaction and may allow the actual data interaction to be processed. Simulation engine 160 may be configured to perform the pre-check by comparing the synthetic smart contract 164 with the smart contract being used for the suspicious data interaction 146. As described above the synthetic smart contract 164 is identical to the original smart contract 134 which a genuine user 112 uses for performing a data interaction. When the synthetic smart contract 164 matches with the smart contract being used for the suspicious data interaction 146, simulation engine 160 determines that the suspicious data interaction 146 is a genuine data interaction (e.g., genuine user 112 is performing the suspicious data interaction 146) and does not simulate the data interaction and allows the data interaction to be processed as usual. However, when the synthetic smart contract 164 fails to match with the smart contract being used for the suspicious data interaction 146, simulation engine 160 determines that the suspicious data interaction 146 is a potential scam data interaction (e.g., the genuine user 112 is not performing the suspicious data interaction 146), and in response, proceeds to simulate the suspicious data interaction 146. For example, the scammer user 114 may use a smart contract that is different from the smart contract 134 generally used by user 112. The different smart contract may allow the scammer user 114 to perform a direct transfer of data objects 129 from the user data file 128 to the scammer data file 130 as opposed to the data objects 129 passing through a decentralized data exchange as may be required by the original smart contract 134. In this case, the synthetic smart contract, which is identical to the original smart contract 134, may not match the different smart contract being used by scammer user 114 for the suspicious data interaction 146.

At operation 306, simulation engine 160 verifies the suspicious data interaction 146 while the simulated data interaction is being performed.

Once the suspicious data interaction 146 fails the pre-check and it has been determined that the suspicious data interaction 146 is a potential scam interaction, the simulation engine 160 proceeds to simulate the suspicious data interaction 146 as described above. Simulation engine 160 may be configured to verify the suspicious data interaction 146 while the simulated data interaction is being performed/processed. In one embodiment, to verify the suspicious data interaction 146 the simulation engine 160 may inspect the smart contract being used for the suspicious data interaction 146.

At operation 308, simulation engine 160 checks whether the suspicious data interaction 146 passed the verification.

As described above, to verify the suspicious data interaction 146 the simulation engine 160 may inspect the smart contract being used for the suspicious data interaction 146. A smart contract may specify one or more conditions for transferring data objects between data files of the blockchain network. In one embodiment, the smart contract being used by the scammer user 114 to perform the suspicious data interaction 146 may specify conditions for transferring data objects 129 from the user data file 128 that are different from conditions specified by an original smart contract 134 generally used by the genuine user 112 to transfer data objects 129 out of the user data file 128. For example, the original smart contract 134 may specify that, before being deposited into a target data file, a transfer of data objects 129 from the user data file 128 must pass through a decentralized data exchange which implements transfer of the data objects 129 between computing nodes based on the smart contract 134. However, the smart contract being used to perform the suspicious data interaction 146 may allow a direct transfer of data objects 129 from the user data file 128 to the scammer data file 130. A direct transfer of data objects 129 allows the scammer user 114 to evade one or more conditions implemented by the decentralized data exchange based on the original smart contract 134. The simulation engine 160 may be configured to determine that the suspicious data interaction 146 has failed verification, when the smart contract used for the suspicious data interaction 146 specifies conditions for transfer of data objects 129 that are different from conditions specified by the original smart contract 134. For example, simulation engine 160 may be configured to determine that the suspicious data interaction 146 has failed verification, when the smart contract used for the suspicious data interaction 146 allows direct transfer direct transfer of data objects 129 from the user data file 128 to the scammer data file 130.

When it is determines at operation 308 that the suspicious data interaction 146 has failed verification, method 300 proceeds to operation 310.

At operation 310, when the suspicious data interaction 146 cannot be verified, simulation engine 160 disables one or more future data interactions processed using the same smart contract used to process the suspicious data interaction 146.

As described above, when the suspicious data interaction 146 fails verification, simulation engine 160 may be configured to block the suspicious data interaction 146 from being processed. Additionally or alternatively, simulation engine 160 may be configured to disable one or more future data interactions processed using the same smart contract used to process the suspicious data interaction 146. In one embodiment, the synthetic smart contract 164 may be programmable and may include self-reactive software code. When simulation engine 160 determines that the suspicious data interaction 146 failed verification, the self-reactive software code may be activated and automatically processed to disable future data interactions that use the same smart contract used to process the suspicious data interaction 146, meaning any further theft of data objects 129 may be stopped. In one embodiment, the self-reactive software code modifies the smart contract used to perform the suspicious data interaction 146 to generate a modified smart contract that specifies that any future data interactions performed using the same smart contract will be automatically flagged and disabled. Modifying the smart contract may include adding one or more lines of software code to the smart contract that flags and disables future data interactions. For example, when a future data interaction is performed based on the modified smart contract (e.g., with the added software code), the one or more lines of code are automatically processed to disable the future data interaction. As described above, once generated and stored in the blockchain 124, a smart contract cannot be modified. Thus, the scammer user 114 may not be able to change the modified smart contract without discarding the scammer data file 130. This prohibits the scammer user 114 from performing any future data interactions using the same smart contract that was used to perform the first suspicious data interaction 146.

When it is determined at operation 308 that the suspicious data interaction 146 passed verification, method 300 proceeds to operation 312 where simulation engine 160 terminates the simulated data interaction and processes the suspicious data interaction.

In an example banking use case, the system and methods disclosed in accordance with embodiments of the present disclosure may help detect scams in relation to a digital wallet of a user 112 and further block future scams. The scams may include theft of digital currency from the digital wallet of the user 112 and transfer of the digital currency to a digital wallet of a scammer user 114. In this context the user data file 128 corresponds to the digital wallet of the user 112 and the scammer data file corresponds to the digital wallet of the scammer user 114. Data interactions correspond to online transactions including transfer of funds between digital wallets of users 110. It may be noted that the methods discussed in this disclosure relating to detecting suspicious data interactions, predicting future suspicious data interactions, simulating suspicious data interactions and avoiding future scam data interactions equally apply to the banking use case.

Figure 4:
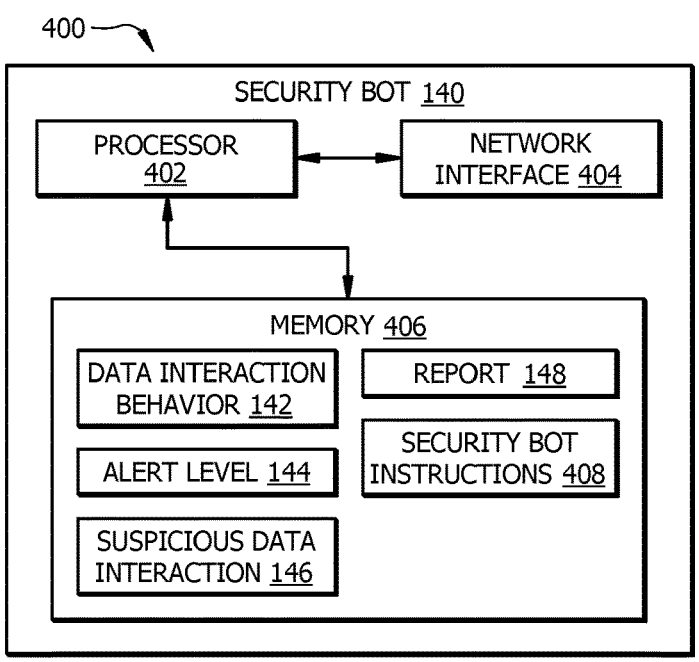
FIG. 4 illustrates an example schematic diagram of a security bot shown in FIG. 1, in accordance with one or more aspects of the present disclosure.

FIG. 4 illustrates an example schematic diagram 400 of a security bot 140 shown in FIG. 1, in accordance with one or more aspects of the present disclosure.

The security bot 140 comprises a processor 402, a memory 406, and a network interface 404. The security bot 140 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., security bot instructions 408) to implement the security bot 140. In this way, processor 402 may be a special-purpose computer designed to implement the functions disclosed herein. In one or more embodiments, the security bot 140 is implemented using logic units, FPGAs, ASICs, DSPs, or any other suitable hardware. The security bot 140 is configured to operate as described with reference to FIG. 2. For example, the processor 402 may be configured to perform at least a portion of the method 200 as described in FIG. 2.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the data interaction behavior 142, alert level 144, suspicious data interaction 146, report 148 and the security bot instructions 408. The security bot instructions 408 may include any suitable set of instructions, logic, rules, or code operable to execute the security bot 140.

The network interface 404 is configured to enable wired and/or wireless communications. The network interface 404 is configured to communicate data between the security bot 140 and other devices, systems, or domains (e.g. user devices 110, simulation engine 160 etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
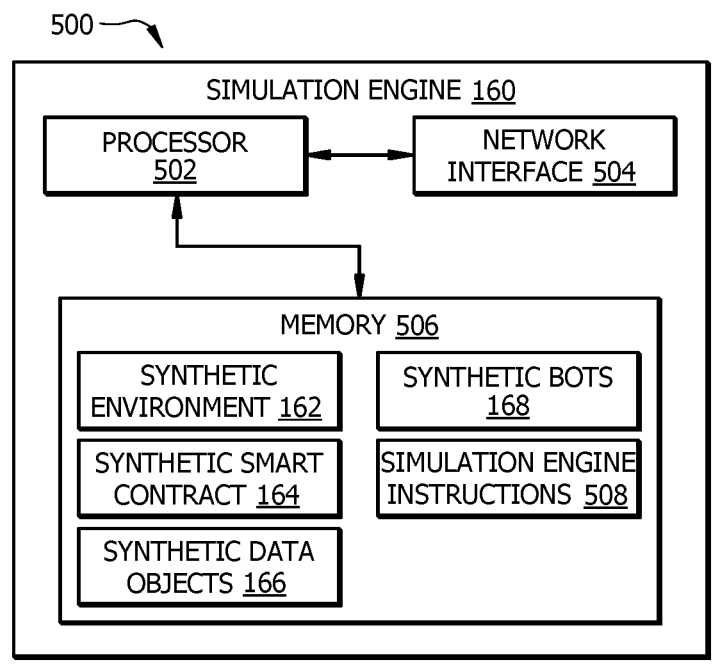
FIG. 5 illustrates an example schematic diagram of a simulation engine shown in FIG. 1, in accordance with one or more aspects of the present disclosure.

FIG. 5 illustrates an example schematic diagram 500 of a simulation engine 160 shown in FIG. 1, in accordance with one or more aspects of the present disclosure.

The simulation engine 160 comprises a processor 502, a memory 506, and a network interface 504. The simulation engine 160 may be configured as shown in FIG. or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 402 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., simulation engine instructions 508) to implement the simulation engine 160. In this way, processor 502 may be a special-purpose computer designed to implement the functions disclosed herein. In one or more embodiments, the simulation engine 160 is implemented using logic units, FPGAs, ASICs, DSPs, or any other suitable hardware. The simulation engine 160 is configured to operate as described with reference to FIG. 3. For example, the processor 502 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store the synthetic environment 162, synthetic smart contract 164, synthetic data objects 166, synthetic bots 168 and the simulation engine instructions 508. The simulation engine instructions 508 may include any suitable set of instructions, logic, rules, or code operable to execute the simulation engine 160.

The network interface 504 is configured to enable wired and/or wireless communications. The network interface 504 is configured to communicate data between the simulation engine 160 and other devices, systems, or domains (e.g. user devices 110, security bots 140 etc.). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of computing nodes that form a blockchain network, wherein one or more of the computing nodes is a metaverse computing node configured to generate a mixed reality environment and to allow users of the blockchain network to enter the mixed reality environment using one or more mixed reality interface devices to perform data interactions;
wherein a processor of at least one computing node is configured to:
record a plurality of data interactions performed by a user using a metaverse computing node, wherein the data interactions include receiving data objects into a data file of the user or sending data objects from the data file of the user;
determine, based on the plurality of data interactions, a data interaction behavior of the user in relation to the data file;
detect that a data interaction performed in relation to the data file of the user or predicted to be performed in relation to the data file of the user is not in accordance with the data interaction behavior of the user;
in response to the detecting, determine that the data interaction is a suspicious data interaction;
assign an alert level to the suspicious data interaction based on an amount of data objects associated with the data interaction, wherein a higher alert level is assigned for a higher amount of data objects associated with the data interaction;
determine, based on the assigned alert level, at least one action to be performed to avoid theft of the data objects associated with the data interaction; and
perform the at least one action to avoid theft of the data objects.

2. The system of claim 1, wherein:
the data interaction behavior comprises receiving a first number of data objects in the data file in accordance with a schedule; and
the data interaction comprises receiving a portion of the first number of data objects in the data file at a scheduled time in accordance with the schedule;
wherein the processor is further configured to:
detect that the portion of the first number of data objects was received in the data file at the scheduled time, wherein the portion is less than the first number of data objects expected to be received in the data file according to the schedule; and
in response to detecting that the portion of the first number of data objects was received, determine that the data interaction is a suspicious data interaction.

3. The system of claim 1, wherein the processor is further configured to:
record a plurality of thefts of data objects from the data file of the user by a scammer computing node, wherein the scammer computing node is one of the computing nodes of the blockchain network;
determine, based on the plurality of thefts, a data interaction behavior of the scammer computing node in relation to stealing data objects from the data file of the user;
predict based on the data interaction behavior of the user and the data interaction behavior of the scammer computing node, that a future data interaction to be performed by the user can result in a theft of data objects from the data file of the user;
estimate an amount of data objects that can be stolen in the future data interaction based at least on the data interaction behavior of the scammer computing node;
assign an alert level to the future data interaction based on the amount of data objects estimated to be stolen, wherein a higher alert level is assigned for a higher amount of data objects;
determine, based on the assigned alert level, at least one action to be performed to avoid theft of the data objects associated with the future data interaction; and
perform the at least one action to avoid theft of the data objects.

4. The system of claim 1, wherein the processor is further configured to:
review a record of the suspicious data interaction stored in a blockchain ledger of the blockchain;
generate, based at least on reviewing the record, a report including information relating to the suspicious data interaction, the information comprising one or more of a digital identity of the data file of the user, a smart contract of the user relating to the suspicious data interaction, a digital identity of a potential scammer data file, a time the suspicious data interaction was processed and the amount of data objects associated with the suspicious data interaction; and
send the report to an administrative computing node of the blockchain network.

5. The system of claim 1, wherein the at least one action comprises one or more of blocking the suspicious data interaction from being processed completely, placing a temporary hold on all data interactions performed in relation to the data file of the user, and placing a temporary hold on all data interactions performed in relation to potential scammer data file associated with the suspicious data interaction.

6. The system of claim 1, wherein the processor is configured to assign the alert level to the suspicious data interaction by:
detecting that the amount of data objects associated with the data interaction equals or exceeds a threshold amount of data objects;
in response, assigning a high alert level to the suspicious data interaction; and
determining that the at least one action to be performed includes:
simulating the suspicious data interaction by launching a synthetic mixed reality environment that clones a real mixed reality environment in which the suspicious data interaction relating to the data file is being performed; and
verifying the suspicious data interaction while the simulated data interaction is being performed in the synthetic mixed reality environment.

7. The system of claim 1, wherein the processor is further configured to:
detect that a second data interaction was initiated to receive data objects into the data file of the user;
determine that at least a portion of the data objects were not received in the data file of the user;
in response to determining that at least a portion of the data objects were not received in the data file of the user, determine that the second data interaction is a suspicious data interaction.

8. A method for detecting suspicious data interactions, comprising:
recording a plurality of data interactions performed by a user using a metaverse computing node, wherein the data interactions include receiving data objects into a data file of the user or sending data objects from the data file of the user;

determining, based on the plurality of data interactions, a data interaction behavior of the user in relation to the data file;

detecting that a data interaction performed in relation to the data file of the user or predicted to be performed in relation to the data file of the user is not in accordance with the data interaction behavior of the user;

in response to the detecting, determining that the data interaction is a suspicious data interaction;

assigning an alert level to the suspicious data interaction based on an amount of data objects associated with the data interaction, wherein a higher alert level is assigned for a higher amount of data objects associated with the data interaction;

determining, based on the assigned alert level, at least one action to be performed to avoid theft of the data objects associated with the data interaction; and performing the at least one action to avoid theft of the data objects.

9. The method of claim 8, wherein:

the data interaction behavior comprises receiving a first number of data objects in the data file in accordance with a schedule; and the data interaction comprises receiving a portion of the first number of data objects in the data file at a scheduled time in accordance with the schedule;

further comprising:
  detecting that the portion of the first number of data objects was received in the data file at the scheduled time, wherein the portion is less than the first number of data objects expected to be received in the data file according to the schedule; and
  in response to detecting that the portion of the first number of data objects was received, determining that the data interaction is a suspicious data interaction.

10. The method of claim 8, further comprising:

recording a plurality of thefts of data objects from the data file of the user by a scammer computing node, wherein the scammer computing node is one of the computing nodes of the blockchain network;

determining, based on the plurality of thefts, a data interaction behavior of the scammer computing node in relation to stealing data objects from the data file of the user;

predicting based on the data interaction behavior of the user and the data interaction behavior of the scammer computing node, that a future data interaction to be performed by the user can result in a theft of data objects from the data file of the user;

estimating an amount of data objects that can be stolen in the future data interaction based at least on the data interaction behavior of the scammer computing node;

assigning an alert level to the future data interaction based on the amount of data objects estimated to be stolen, wherein a higher alert level is assigned for a higher amount of data objects;

determining, based on the assigned alert level, at least one action to be performed to avoid theft of the data objects associated with the future data interaction; and performing the at least one action to avoid theft of the data objects.

11. The method of claim 8, further comprising:

reviewing a record of the suspicious data interaction stored in a blockchain ledger of the blockchain;

generating, based at least on reviewing the record, a report including information relating to the suspicious data interaction, the information comprising one or more of a digital identity of the data file of the user, a smart contract of the user relating to the suspicious data interaction, a digital identity of a potential scammer data file, a time the suspicious data interaction was processed and the amount of data objects associated with the suspicious data interaction; and sending the report to an administrative computing node of the blockchain network.

12. The method of claim 8, wherein the at least one action comprises one or more of blocking the suspicious data interaction from being processed completely, placing a temporary hold on all data interactions performed in relation to the data file of the user, and placing a temporary hold on all data interactions performed in relation to potential scammer data file associated with the suspicious data interaction.

13. The method of claim 8, wherein assigning the alert level to the suspicious data interaction comprises:

detecting that the amount of data objects associated with the data interaction equals or exceeds a threshold amount of data objects;

in response, assigning a high alert level to the suspicious data interaction; and determining that the at least one action to be performed includes:
  simulating the suspicious data interaction by launching a synthetic mixed reality environment that clones a real mixed reality environment in which the suspicious data interaction relating to the data file is being performed; and
  verifying the suspicious data interaction while the simulated data interaction is being performed in the synthetic mixed reality environment.

14. The method of claim 8, further comprising:

detecting that a second data interaction was initiated to receive data objects into the data file of the user;

determining that at least a portion of the data objects were not received in the data file of the user;

in response to determining that at least a portion of the data objects were not received in the data file of the user, determining that the second data interaction is a suspicious data interaction.

15. A non-transitory computer-readable medium for detecting suspicious data interactions, the computer-readable medium storing instructions which when executed by a processor perform a method comprising:

recording a plurality of data interactions performed by a user using a metaverse computing node, wherein the data interactions include receiving data objects into a data file of the user or sending data objects from the data file of the user;

determining, based on the plurality of data interactions, a data interaction behavior of the user in relation to the data file; detecting that a data interaction performed in relation to the data file of the user or predicted to be performed in relation to the data file of the user is not in accordance with the data interaction behavior of the user;

in response to the detecting, determining that the data interaction is a suspicious data interaction; assigning an alert level to the suspicious data interaction based on an amount of data objects associated with the data interaction, wherein a higher alert level is assigned for a higher amount of data objects associated with the data interaction;

determining, based on the assigned alert level, at least one action to be performed to avoid theft of the data objects associated with the data interaction; and performing the at least one action to avoid theft of the data objects.

16. The non-transitory computer-readable medium of claim 15, wherein:

the data interaction behavior comprises receiving a first number of data objects in the data file in accordance with a schedule; and the data interaction comprises receiving a portion of the first number of data objects in the data file at a scheduled time in accordance with the schedule;

further comprising instruction for:

detecting that the portion of the first number of data objects was received in the data file at the scheduled time, wherein the portion is less than the first number of data objects expected to be received in the data file according to the schedule; and in response to detecting that the portion of the first number of data objects was received, determining that the data interaction is a suspicious data interaction.

17. The non-transitory computer-readable medium of claim 15, further comprising instruction for:

recording a plurality of thefts of data objects from the data file of the user by a scammer computing node, wherein the scammer computing node is one of the computing nodes of the blockchain network;

determining, based on the plurality of thefts, a data interaction behavior of the scammer computing node in relation to stealing data objects from the data file of the user;

predicting based on the data interaction behavior of the user and the data interaction behavior of the scammer computing node, that a future data interaction to be performed by the user can result in a theft of data objects from the data file of the user;

estimating an amount of data objects that can be stolen in the future data interaction based at least on the data interaction behavior of the scammer computing node;

assigning an alert level to the future data interaction based on the amount of data objects estimated to be stolen, wherein a higher alert level is assigned for a higher amount of data objects;

determining, based on the assigned alert level, at least one action to be performed to avoid theft of the data objects associated with the future data interaction; and performing the at least one action to avoid theft of the data objects.

18. The non-transitory computer-readable medium of claim 15, further comprising instruction for:

reviewing a record of the suspicious data interaction stored in a blockchain ledger of the blockchain;

generating, based at least on reviewing the record, a report including information relating to the suspicious data interaction, the information comprising one or more of a digital identity of the data file of the user, a smart contract of the user relating to the suspicious data interaction, a digital identity of a potential scammer data file, a time the suspicious data interaction was processed and the amount of data objects associated with the suspicious data interaction; and sending the report to an administrative computing node of the blockchain network.

19. The non-transitory computer-readable medium of claim 15, wherein the at least one action comprises one or more of blocking the suspicious data interaction from being processed completely, placing a temporary hold on all data interactions performed in relation to the data file of the user, and placing a temporary hold on all data interactions performed in relation to potential scammer data file associated with the suspicious data interaction.

20. The non-transitory computer-readable medium of claim 15, wherein assigning the alert level to the suspicious data interaction comprises:

detecting that the amount of data objects associated with the data interaction equals or exceeds a threshold amount of data objects;

in response, assigning a high alert level to the suspicious data interaction; and determining that the at least one action to be performed includes:

simulating the suspicious data interaction by launching a synthetic mixed reality environment that clones a real mixed reality environment in which the suspicious data interaction relating to the data file is being performed; and verifying the suspicious data interaction while the simulated data interaction is being performed in the synthetic mixed reality environment.

* * * * *